No. 867,000. PATENTED SEPT. 24, 1907.
J. C. BARBER.
ANTIFRICTION CENTER BEARING FOR CARS.
APPLICATION FILED AUG. 28, 1906.

Witnesses,
Inventor:
John C. Barber,
By his Attorneys

UNITED STATES PATENT OFFICE.

JOHN C. BARBER, OF CHICAGO, ILLINOIS.

ANTIFRICTION CENTER-BEARING FOR CARS.

No. 867,000.　　　　Specification of Letters Patent.　　　Patented Sept. 24, 1907.

Application filed August 28, 1906. Serial No. 332,318.

*To all whom it may concern:*

Be it known that I, JOHN C. BARBER, a citizen of the United States, residing at Chicago, in the county of Cook and State of Illinois, have invented certain new and useful Improvements in Antifriction Center-Bearings for Cars; and I do hereby declare the following to be a full, clear, and exact description of the invention, such as will enable others skilled in the art to which it appertains to make and use the same.

My present invention has for its especial object to provide an improved anti-friction center bearing for cars, and to this end it consists of the novel devices and combinations of devices hereinafter described and defined in the claims. The invention is illustrated in the accompanying drawings wherein like characters indicate like parts throughout the several views.

Figure 1:
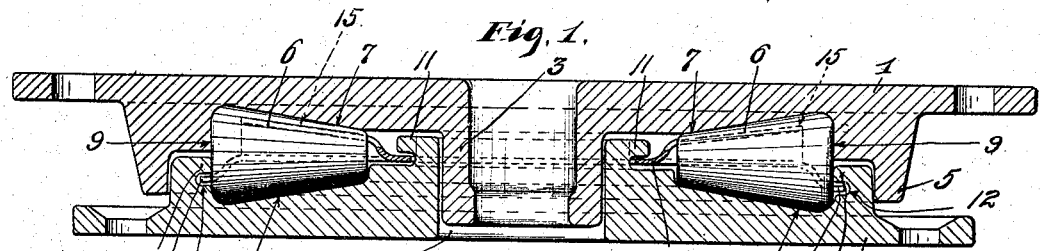
Figure 2:
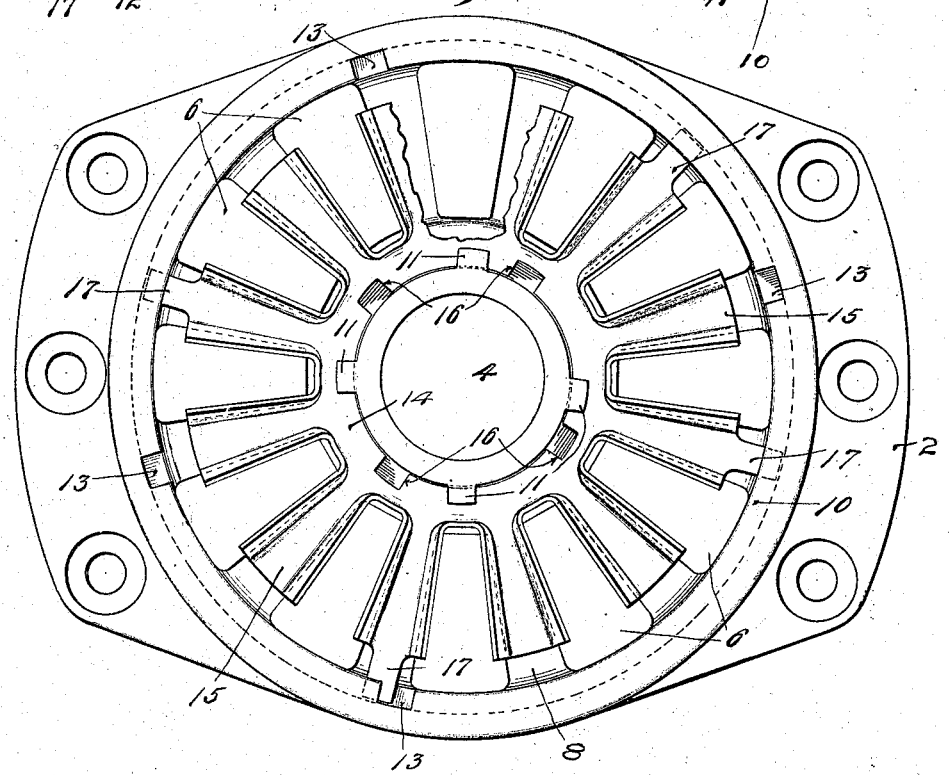
Figure 3:
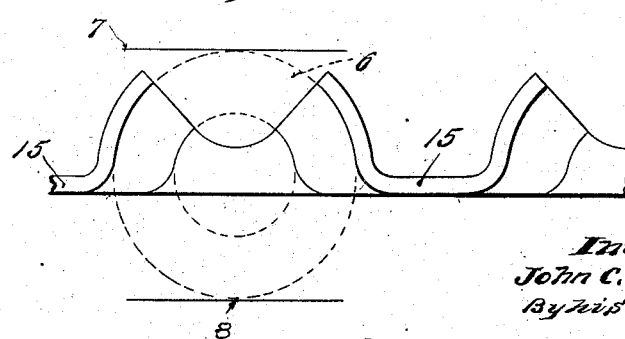

Referring to the drawings: Figure 1 is a vertical section taken centrally through a center bearing designed in accordance with my invention. Fig. 2 is a plan view of the center bearing with the upper bearing member removed, and with some parts broken away, and Fig. 3 is a detail in end elevation showing one of the arms of the so-called roller spacing ring, one of the rollers being indicated by dotted lines.

The numeral 1 indicates the upper member, and the numeral 2, the lower member of the center bearing, the former of which is adapted to be bolted or otherwise rigidly secured to the body bolster of the car, and the latter of which is adapted to be bolted or otherwise rigidly secured to a truck bolster, which bolsters are not shown in the accompanying drawings. The upper bearing member 1 is formed with a depending hub 3 that works pivotally within a seat 4 formed in the center of the lower bearing member 2. In practice the usual king bolt is adapted to be passed through the hub 3. As shown, the upper bearing member 1 is also formed near its outer portion with a depending annular thrust flange 5 that surrounds a raised portion of the lower bearing member 2. The said thrust flange 5, so-called, also serves as a dust guard or shield.

Radially disposed conical bearing rollers 6 are interposed between the bearing members 1 and 2, and are arranged to run upon conical bearing surfaces 7 and 8 formed respectively on the said bearing members. The upper bearing member 1 is provided with an annular shoulder 9 that engages the outer extremities of the bearing rollers 6, and the lower bearing member 2 at the upper extremity of its central seat 4 is provided with outwardly extended lock lugs 11. The annular rib 10 of the said roller bearing member 2 is formed in its inner face with an annular groove 12. That portion of the rib 10 that overlies the groove 12, and which operates as a lock flange, is formed with a plurality of notches 13.

The principal feature of this invention consists of a so-called spacing ring or roller spacing device, that is adapted to be locked to one of the bearing members in such manner that the rollers, while free for the usual movements under the pivotal movements of the bearing members with respect to each other, will, nevertheless, hold the said rollers interlocked to the said bearing member when the bearing members are separated. In the construction illustrated, this roller spacing device is in the form of a ring 14 that is provided with a plurality of radially extended arms 15, which arms are of such channel shaped form in cross section, that they closely engage the conical surfaces of the rollers between which they are interposed, and thus hold the said rollers properly spaced apart, but permit free rotation thereof. The roller spacing device is shown as if stamped from sheet metal, but it may be either of malleable iron or of cast steel.

Preferably the lock lugs 11 are unevenly spaced, and the spacing ring 14 at its inner edge is provided with corresponding spaced notches 16. Certain of the arms 15 are provided with outwardly extended lock lugs 17, which in one position of the spacing ring are adapted to be passed through corresponding notches 13 of the rib 10. Otherwise stated, the arrangement of the lock lugs 11 and 17 and notches 13 and 16 is such that the spacing ring may be removed from or applied to the bearing member 2 only when the coöperating lugs and notches are turned into registration, and the said lugs and notches can be turned into registration only in one position of the ring 14 with respect to the bearing member 2. The said spacing ring can be interlocked to the said bearing member entirely by the inner lock lugs or entirely by the outer lock lugs and coöperating lock flanges, but it is preferably interlocked to the said bearing member both at its inner and outer portions.

In assembling the parts of the center bearing, the rollers are first applied to the bearing member 2 and then the spacing ring applied to the said bearing member and to the rollers, and is then turned into such position that under pivotal movements of the center bearing incident to its service on a car, the coöperating lock lugs and notches will not be brought into registration. If desired, a pin or other plug may be applied to one of the notches 13 or 16 so as to thereby prevent separation of the roller spacing ring from the lower bearing member even when the coöperating lugs and notches are turned into registration.

The construction above described, while extremely simple and of small cost, is highly efficient for the purposes had in view. By the spacing ring interlocked to one of the bearing members, accidental separation or displacement of the rollers is prevented when the bearing members are separated either in the case of accident such as a wreck, or when the trucks are purposely removed from the car body. By reference, particularly to Fig. 3, it will be noted that the radial arms of the roller spacing and retaining ring do not come into contact with either the upper or lower members of the center bearing.

What I claim is:

1. The combination with annular upper and lower members of a center bearing, of a complete circuit of rollers interposed between said members, and a roller retaining device interlocked with and against separation from one of said members, but free for traveling movements with said rollers, whereby said rollers are held in position with respect to one of said bearing members, when the upper and lower bearing members of the center bearing are separated, substantially as described.

2. The combination with upper and lower members of a center bearing, of conical rollers interposed between said members, and a roller retaining device in the form of a ring having radial arms, and which retaining device is interlocked to and against separation from one of the said bearing members, but is free for traveling movements with said rollers, whereby said rollers are held in position with respect to one of said bearing members, when the upper and lower bearing members of the center bearing are separated, substantially as described.

3. The combination with upper and lower members of a center bearing, of a roller spacing and retaining device in the form of a ring having radial arms, and which spacing and retaining device is provided with projections adapted to be interlocked to the lower bearing member by vertical and rotary movements, substantially as described.

4. The combination with upper and lower members of a center bearing, the latter having lock lugs 11, of conical bearing rollers interposed between said members, and a spacing ring 14 having radial arms 15 that engage said rollers, said ring and notches 16 which when turned into registration with said lock lugs 11, permit said ring to be applied to or removed from said lower bearing member, substantially as described.

5. In a center bearing, the combination with an upper bearing member 1 having a depending hub 3, of a lower bearing member 2 formed with a center seat 4 for said hub 3, said bearing member 2 having lock lugs 11, and an annular rib 10 with an annular groove 12 and notches 13, conical bearing rollers 6 interposed between said bearing members 1 and 2, and a ring 14 with radial roller spacing and retaining arms 15, said ring having notches 16, and certain of said arms 15 having lock lugs 17, substantially as and for the purposes set forth.

6. The combination with upper and lower members of a center bearing, of a roller retaining device having projections adapted to be interlocked to one of the said bearing members, by vertical and rotary movements, substantially as described.

In testimony whereof I affix my signature in presence of two witnesses.

JOHN C. BARBER.

Witnesses:
LEE W. BARBER,
O. N. PARMELEE.